United States Patent
Chini et al.

(10) Patent No.: US 10,690,418 B2
(45) Date of Patent: Jun. 23, 2020

(54) HEAT EXCHANGER FOR AT LEAST PARTIAL ARRANGEMENT IN A SERVICE LIQUID TANK AND HEAT-EXCHANGER BODY FOR SUCH A HEAT EXCHANGER

(71) Applicant: Röchling Automotive SE & Co. KG, Mannheim (DE)

(72) Inventors: Fabrizio Chini, Isera (IT); Luca Marini, Besenello (IT); Ivan De Metri, Bolzano (IT); Francesca Brunori, Laives (IT); Stefano Dalpez, Male (IT)

(73) Assignee: Röchling Automotive SE & Co. KG, Mannheim (DE)

( * ) Notice: Subject to any disclaimer, the term of this patent is extended or adjusted under 35 U.S.C. 154(b) by 428 days.

(21) Appl. No.: 15/445,636

(22) Filed: Feb. 28, 2017

(65) Prior Publication Data
US 2017/0254594 A1    Sep. 7, 2017

(30) Foreign Application Priority Data
Mar. 3, 2016   (DE) .......................... 10 2016 203 558

(51) Int. Cl.
*F28F 19/01*    (2006.01)
*F28D 1/02*    (2006.01)
(Continued)

(52) U.S. Cl.
CPC .......... *F28D 1/0213* (2013.01); *F28F 19/006* (2013.01); *F28F 19/01* (2013.01);
(Continued)

(58) Field of Classification Search
CPC .......... F01N 3/10; F28D 20/00; F28D 1/0213; F28F 9/00; B01D 21/009; F02M 31/125
(Continued)

(56) References Cited

U.S. PATENT DOCUMENTS 4,502,956 A * 3/1985 Wilson ............... B01D 17/0208
                                                    210/248
2006/0021745 A1* 2/2006 Fritze ..................... B29C 65/02
                                                    165/172
(Continued)

FOREIGN PATENT DOCUMENTS

DE    44 32 577 A1    3/1996
DE    199 35 920 A1   3/2001
(Continued)

OTHER PUBLICATIONS

Search Report issued for German Patent Application No. 10 2016 203 558.4 dated Nov. 9, 2016 with machine English translation (13 pages).

*Primary Examiner* — Serkan Akar
*Assistant Examiner* — Spencer H. Kirkwood (57) ABSTRACT

A heat exchanger (10) for arrangement inside a service-liquid tank (12), in particular inside a motor-vehicle service-liquid tank (12), comprising:
  a heat-exchanger liquid reservoir (14) for receiving a supply of liquid (22),
  an electric heating device (20) which is constructed and arranged for the transfer of heat into the heat-exchanger liquid reservoir (14), and
  a heat-exchanger line (24) which originates at least from the heat-exchanger liquid reservoir (14) and which is designed for the transfer of heat from the liquid flowing in the heat-exchanger line (24) to an area (26) outside the heat-exchanger line (24),
characterized in that the heat-exchanger line (24), as a circulation line, discharges into the heat-exchanger liquid reservoir (14).

20 Claims, 4 Drawing Sheets

(51) Int. Cl.
*F28F 21/06* (2006.01)
*F28F 19/00* (2006.01)
F01N 3/20 (2006.01)
F28D 21/00 (2006.01)

(52) U.S. Cl.
CPC .......... *F28F 21/065* (2013.01); *F28F 21/067* (2013.01); *F01N 3/2066* (2013.01); *F01N 2240/02* (2013.01); *F01N 2610/1406* (2013.01); *F28D 2021/008* (2013.01)

(58) Field of Classification Search
USPC ....................................................... 392/341
See application file for complete search history.

(56) References Cited

U.S. PATENT DOCUMENTS

2008/0267845 A1* 10/2008 Hoglund ............... B01F 5/0451
422/224
2010/0314087 A1* 12/2010 Daly ...................... F25J 1/0022
165/168
2018/0252128 A1* 9/2018 Rossignol ............... F01M 5/002

FOREIGN PATENT DOCUMENTS

| DE | 10 2005 059 581 A1 | 6/2007 | |
|----|----|----|----|
| DE | 102005059581 A1 * | 6/2007 | ............ B01D 53/90 |
| DE | 10 2009 028 113 | 2/2011 | |
| DE | 10 2013 206 589 A1 | 10/2014 | |

* cited by examiner

HEAT EXCHANGER FOR AT LEAST PARTIAL ARRANGEMENT IN A SERVICE LIQUID TANK AND HEAT-EXCHANGER BODY FOR SUCH A HEAT EXCHANGER

CROSS REFERENCE TO RELATED APPLICATION(S)

This application claims priority to German Application No. 10 2016 203 558.4, filed Mar. 3, 2016. The entirety of the disclosure of the above-referenced application is incorporated herein by reference.

BACKGROUND OF THE INVENTION

Field of the Invention

The present invention relates to a heat exchanger for arrangement in a service liquid tank, in particular in a motor vehicle tank, comprising:
a heat-exchanger liquid reservoir for accepting a supply of liquid,
an electric heating device that is constructed and disposed to transfer heat into the heat-exchanger liquid reservoir, and
a heat-exchanger line that originates at least from the heat-exchanger liquid reservoir, and which is constructed for the transfer of heat from the liquid flowing in the heat-exchanger line to an area outside the heat-exchanger line.

Description of the Related Art

A heat exchanger of the above-described type is known from DE 10 2009 028 113 A1.

It is known from this publication to heat liquid with an electric heating device inside a heat-exchanger liquid reservoir separate from the reservoir volume of the motor vehicle service tank, and pump it away from the heat-exchanger liquid reservoir via a line. More specifically, in the case of the known heat exchanger the liquid is pumped from the heat-exchanger liquid reservoir out of the motor vehicle service-liquid tank for its intended use. Here the line of the known heat exchanger extends through the reservoir volume of the motor-vehicle service-liquid tank and then exits the motor-vehicle service-liquid tank, wherein when flowing through the line, which is actually not a primary heat-exchanger line but rather a pumping line, whose pumped material unavoidably gives off some heat during the pumping; due to the short length of time the heat-exchanger liquid remains in the line, only a small amount of heat from said liquid can be transferred to the reservoir volume of the service-liquid tank.

A similar service-liquid tank with heat exchanger is also known from DE 10 2009 029 313 A1.

The service-liquid tank in the last-mentioned publication has an additional heat-exchanger line. The heat-exchanger line, through which either cooling liquid or exhaust gas from the internal combustion engine of a motor vehicle flows, passes through the reservoir volume of the service-liquid tank in order to emit heat from the heat-exchanger fluid: exhaust gas or coolant liquid, to the reservoir volume of the service-liquid tank. The exhaust gas or the coolant liquid is not heated by an electric heating device, because the internal combustion engine serves as the heat source.

The electric heating device is additionally present in the service-liquid tank, so that it can, as in the publication covering the device of the above-described type, also itself melt service liquid locally in the tank, when the internal combustion engine is still cold, and the coolant liquid is therefore not temperate enough to heat the service liquid, or an exhaust gas might not yet be flowing, because the internal combustion engine has not yet been put into operation.

In the case of the heat exchanger of the above-described type, the service liquid stored in the actual service-liquid tank is used as the heat-exchanger liquid.

In DE 10 2009 029 313 A two different heat-exchanger liquids are used, in one instance, as in the publication covering the device of the above-described type, it is the actual service liquid stored in the tank, and in the second instance, it is the fluid explained above, in the form of either exhaust gas or of coolant liquid of the internal combustion engine.

SUMMARY OF THE INVENTION

The object of the present invention is to specify a heat exchanger of the above-described type, i.e. a heat exchanger with an electric heating device, which can transfer heat more effectively to the inside of a service-liquid tank than the heat exchangers in the prior art are able to.

This object is inventively achieved by a heat exchanger of the type mentioned at the beginning, wherein the heat-exchanger line, as a circulation line, discharges into the heat-exchanger liquid reservoir.

The heat-exchanger line is thus configured as a circulation line, which allows the liquid received by the heat-exchanger liquid reservoir to circulate between the electric heating device and a heat-emission area, so that—in contrast to the prior art—heated liquid is not simply conveyed through the service-liquid tank and out of it, but rather said heated liquid can flow repeatedly through the service-liquid tank and can thus ensure continuous heating of the service liquid received in the tank.

Then the electric heating device only has to replace the heat quantity emitted in the heat-emission region of the heat-exchanger line, which also reduces the energy consumption of the inventive heat exchanger compared to the heat exchanger of the above-described type.

Because the heated liquid is not simply conveyed out of the service-liquid tank, as is the case in the prior art, it is not suddenly lost as a heat reservoir, which, in the prior art, is particularly disadvantageous when there is an emptying of a liquid bubble surrounding the heating device in the otherwise frozen service liquid.

The heat exchanger can comprise at least two components which, joined together, form between them at least one section of the heat-exchanger line. In this way, the two components can for example be partial or half-shells, each with recesses formed in them, wherein the half-shells can be fitted together to make a heat-exchanger component in which the recesses complement each other, forming a section of the heat-exchanger line. A recess can also be formed in only one of the two shell components, said recess being covered during joining by the other shell component, forming a section of a heat-exchanger line. In order to increase the amount of heat that can be conveyed per unit of time through the heat-exchanger line, it can be additionally provided that the heat exchanger, at least in sections, preferably at least in a section contributing to the construction of the heat-exchanger line, is manufactured from a filled plastic with a plastic matrix and filler particles embedded therein, wherein the filler-particle material has a higher thermal conductivity than the plastic material of the matrix. In this way a material is provided for constructing the heat exchanger which has a greater thermal conductivity and a lower thermal-conductivity resistance than unfilled plastic material. The plastic material of the plastic matrix is preferably thermoplastically deformable, so that the filled plastic can be given a desired shape by injection molding or a comparable forming process. However an unfilled plastic should not be ruled out for constructing the heat-exchanger line.

The heat exchanger can have additional functions, in particular in the region of the heat-exchanger line-section formed as explained above by the at least two components that are to be joined; these are additional functions for which a special functional component would otherwise have to be provided. It can for example be provided that the heat exchanger has a filter carrier, in or on which a filter material is or can be arranged, preferably interchangeably arranged, outside the heat-exchanger line. The filter carrier is preferably designed as an integral part of the heat exchanger.

In this way the heat exchanger can also serve the purpose of filtering the service liquid in the service-liquid tank before the liquid is extracted from the tank. In order to ensure that liquid service-liquid can, if necessary, also flow through the filter material that can be arranged in the filter carrier, a section of the heat-exchanger line can run inside the filter carrier. In this way, the heat-exchanger can transfer heat to the service liquid, or generally to its external surroundings in the immediate proximity of the filter carrier, so that sufficient heat, and thus service liquid in liquid form, can be guaranteed precisely in the region of the filter carrier.

Furthermore, a pumping line that is separate from the heat-exchanger line can be provided inside the heat exchanger. With this pumping line, service liquid can be pumped out of the service-liquid tank for the intended use of the service liquid.

For the pumping of service liquid that is as clean as possible, the pumping line preferably extends originating from an outlet in the region of the filter carrier. The filter carrier can have a wall enclosing a volume area. The outlet of the pumping line can then preferably lie in the volume area surrounded by the wall. One section of the heat-exchanger line preferably extends, for the above-mentioned reasons, inside the surrounding wall. In order to prevent the service liquid in the pumping line from solidifying, or as the case may be freezing, at least in sections, the pumping line preferably extends, at least in sections, parallel to a section of the heat-exchanger line, to be precise, if possible in the immediate proximity of the heat-exchanger line section, separated for example from the pumping line only by a common dividing wall that separates the heat-exchanger line from the pumping line. The outlet of the pumping line is also preferably surrounded by a section of the heat-exchanger line, the outlet and the wall section particularly preferably being separated from one another only by a common separating wall, in order to have the most direct heat transmission possible.

A particularly functionally reliable pumping line can be obtained by the pumping line extending at least in sections between two heat-exchanger line sections, again preferably separated from each heat-exchanger line section only by a dividing wall, through which the heat from the heat-exchanger line can be transferred to the pumping line. Particularly preferably the two heat-exchanger line sections are parallel to one another. They can extend curvilinearly or rectilinearly. Preferably, both the pumping line and the at least one heat-exchanger line section are rectilinearly constructed in order to provide flow paths in the filter carrier, said paths originating from the preferred outlet of the conveyor line, that are as short as possible.

In order to provide one or more of the functions named above, the heat exchanger can preferably have a heat-exchanger body wherein a section of the heat-exchanger line is constructed. The heat-exchanger body can particularly preferably be constructed of the components mentioned above, in particular template components, which, joined together, form a section of the heat-exchanger line.

In addition to the section of the heat-exchanger line, the filter carrier and/or the pumping line can be formed within the heat-exchanger body, in particular integrally therewith. Thus a functionally integrated heat-exchanger body can be constructed from a few components, particularly preferably from only two shell components.

In order to facilitate the assembly of the heat-exchanger body, it can have a connection-body end on which line-connection formations are provided for a supply line to the section of the heat-exchanger line formed inside the heat-exchanger body, and for a discharge line from the same. Then, even though the pumping line, at least in sections, is constructed inside the heat-exchanger body, a line connection formation is made for connecting a line to the section of the pumping line formed within the heat-exchanger body. Furthermore, a bypass line can be provided inside the heat-exchanger body in order to pump service liquid via this bypass line to a consumer, for example an injection assembly. For this bypass line as well, at least one line-connection formation, preferably two line-connection formations—a supply line and a discharge line—can be provided. Configuring all line-connection formations at the connection body end concentrates access to them in one place, and they can be correspondingly connected during assembly. For example, the line-connection formations can be configured for the connection of hose lines in order to connect the heat-exchanger body with flexible lines, for example with the heat-exchanger liquid reservoir and the like.

The heat-exchanger body is preferably a hard-shell body, i.e. a dimensionally-stable body that can be produced for example by injection molding of thermoplastic synthetic material.

The heat-exchanger body is particularly preferably constructed of the filled thermoplastic synthetic material with heightened heat conductivity described above. However this does not have to be the case. Unfilled thermoplastic synthetic material can also be used.

The filter carrier can also be formed inside the heat-exchanger body, in which case between the connection-body end and the filter carrier at least the heat-exchanger line advantageously has flow sections that are parallel to one another, in order to enable the most efficient use, with a large surface area, of the part of the body located between the filter carrier and the connection-body end for heat transfer from the heat-exchanger line to the surroundings of the heat-exchanger body.

The pumping line between the connection-body end and the filter carrier also preferably extends, at least in sections, completely parallel to the heat exchanger line.

The present invention also relates to the heat-exchanger body, configured as described above, as an object in its own right.

The heat-exchanger liquid reservoir can also be constructed as separate from the heat-exchanger body and connectable or connectable, preferably detachably connected or connectable to it in a flow-conveying manner, via conduit means. This permits attachment, independently of the attachment site, of the heat-exchanger liquid reservoir in a site that is particularly well-suited for attachment, for example near an additional heat source such as the internal combustion engine, an exhaust gas manifold, and the like.

Alternatively, the heat-exchanger liquid reservoir can be designed as integral to the heat-exchanger body and constructed, for example, of the components named above, in particular shell components.

The present invention also relates to a service-liquid tank, in particular a motor-vehicle service-liquid tank with a heat exchanger as it is described and further developed above. The present invention also relates to a service-liquid tank, in particular a motor-vehicle service-liquid tank with a heat-exchanger body that is at least partially accommodated therein, as it is described and further developed above.

The heat-exchanger service-liquid reservoir can be situated in the service-liquid tank, wherein it, inside the service-liquid tank, provides a completely sealed-off volume that is only accessible through a supply and a discharge-line. This volume is preferably substantially smaller than the tank volume of the service-liquid tank, approximately 5% or less of that volume. Then, when as preferred, the service-fluid is the actual heat-exchanger liquid, the heat-exchanger liquid reservoir can be open to the tank receiving-volume of the service-liquid tank. Then the heat-exchanger liquid reservoir, can for example, be sealed off in sections, by one or more walls, from the rest of the tank receiving-volume, without being hermetically and completely sealed against the tank reception volume of the service-fluid tank. In this way, it can be ensured that the heat-exchanger liquid reservoir is always filled, as long as the service-liquid tank is filled. In the case of a heat-exchanger liquid reservoir inside the tank that is open to the tank volume, the heat-exchanger liquid reservoir is, in the installation position where it is ready for operation, advantageously open toward the top, however closed toward the side and toward the bottom, when the opening to the tank volume lies clearly under the maximum filling level, preferably under the minimal filling level. In this way, the liquid can flow, even in a filled or only partially filled service-liquid tank, into the heat-exchanger liquid reservoir, whereas the liquid, even when there is an emptied tank, can no longer flow out of the heat-exchanger liquid reservoir. The electric heating device for heating the supply of liquid in the liquid reservoir is preferably located inside the heat-exchanger liquid reservoir.

Alternatively or additionally, the heating device can also be located outside the liquid reservoir, on a dividing wall of the same.

The heat-exchanger liquid reservoir can also be located outside the service-liquid tank and be connected by means of lines, in particular flexible hose lines, to a heat-exchanger line section arranged in the service-liquid tank, connected for example to the heat-exchanger body.

Spillage-protection plates can be formed on the heat-exchanger body in order to limit a movement of liquid in the immediate vicinity of the heat-exchanger body outside of said heat-exchanger body.

BRIEF DESCRIPTION OF THE DRAWING FIGURES

The invention will be explained in more detail below on the basis of the accompanying drawings.

DETAILED DESCRIPTION OF THE PREFERRED EMBODIMENTS

Figure 1:
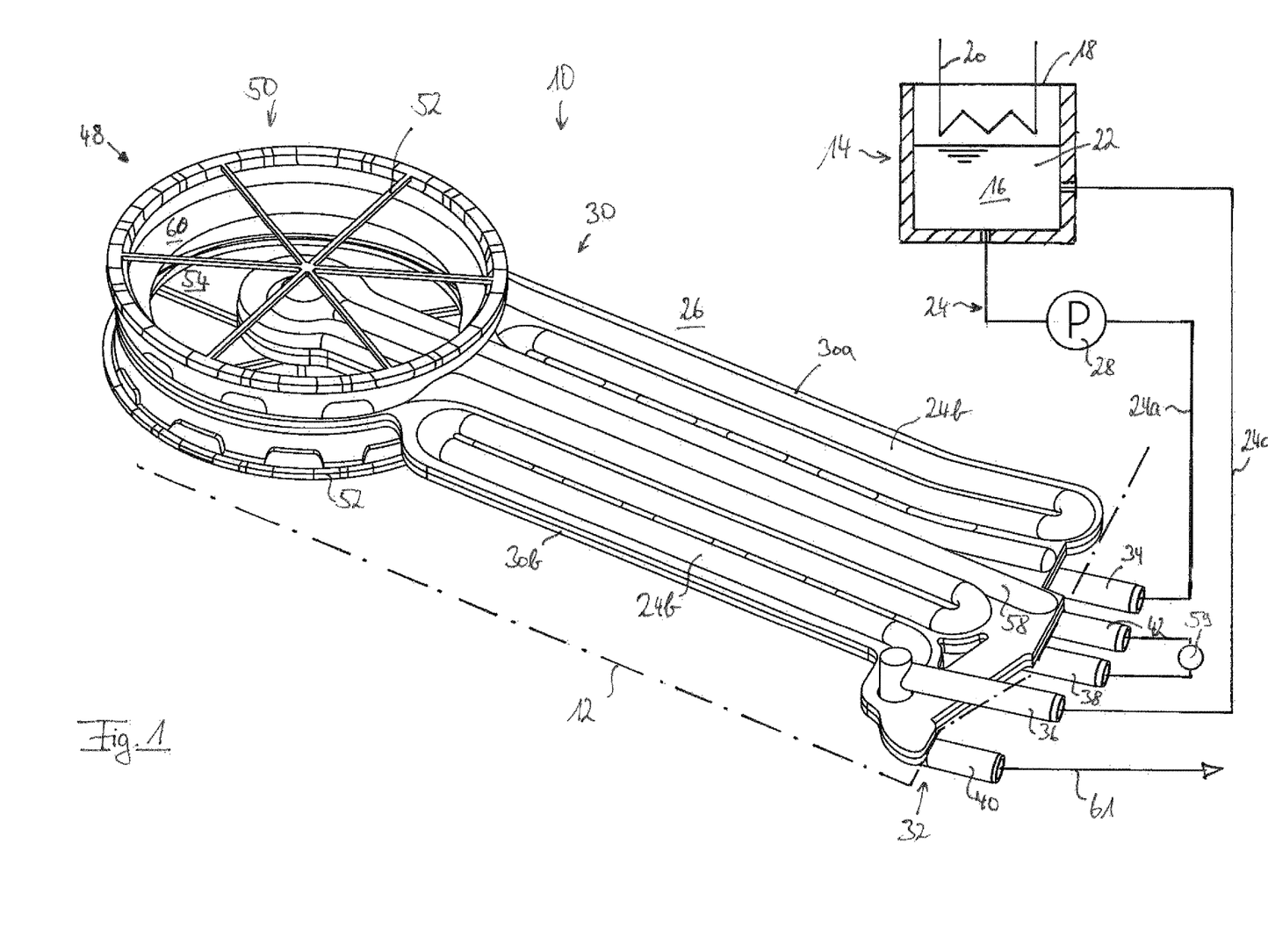
FIG. 1 shows a highly schematic view of an inventive heat exchanger.

In FIG. 1, a highly schematic representation of an inventive embodiment of a heat exchanger according to the present application is designated with 10. The heat exchanger 10 serves to transmit heat to a service liquid, not depicted here, inside a motor-vehicle service-liquid tank 12, which in FIG. 1 is indicated only by a dotted line in a partial sketch.

Aqueous urea solution, for example, is added to the service-liquid tank 12, in order to feed said solution to a selective catalytic reduction of the exhaust gas in the exhaust-gas system of the motor vehicle that carries the tank 12 with the heat exchanger 10.

The heat exchanger 10 comprises a heat-exchanger liquid reservoir 14 that can be arranged in the tank 12 or outside the same. The heat-exchanger liquid reservoir is shown in FIG. 1 as a container that is open at the top, as it is preferably configured with an arrangement of the liquid reservoir 14 inside the service-liquid tank 12, so that service liquid 16 received in the service-liquid tank 12 can flow from above through the opening 18 in the heat-exchanger liquid reservoir 14 into the reservoir, and a sufficient filling of the heat-exchanger liquid reservoir 14 is ensured, i.e. with timely refilling, during the entire proper operation of the tank 12.

The heat exchanger 10 further comprises an electric heating device 20, which in FIG. 1 is only shown in highly schematic form. The electric heating device can, in the known manner, comprise an electric resistance heating trace, which is arranged between two films, or on a substrate, and can be covered with a foil or over-molded with plastic. However only simple and inexpensive heating resistors or other standard heating elements can also be used as an electric heating device.

The electric heating device 20 is preferably arranged in the heat-exchanger liquid reservoir 14, in order to heat the supply of liquid 22, of the service liquid 16 received therein, there directly and keep it in a liquid state.

Furthermore the heat exchanger 10 has a heat-exchanger line 24 that originates from the liquid reservoir 14 and extends at least partially inside the tank 12 in order to give off heat from the liquid flowing in it to an area 26 outside the heat-exchanger line 24. In order to convey liquid from the heat-exchanger liquid reservoir 14 for the purpose of heat emission to the area 26, a pump 28 is preferably provided, which, at a suitable extraction point, conveys liquid from the supply of liquid 22 in the liquid reservoir 14 to a heat-exchange body 30.

Figure 2:
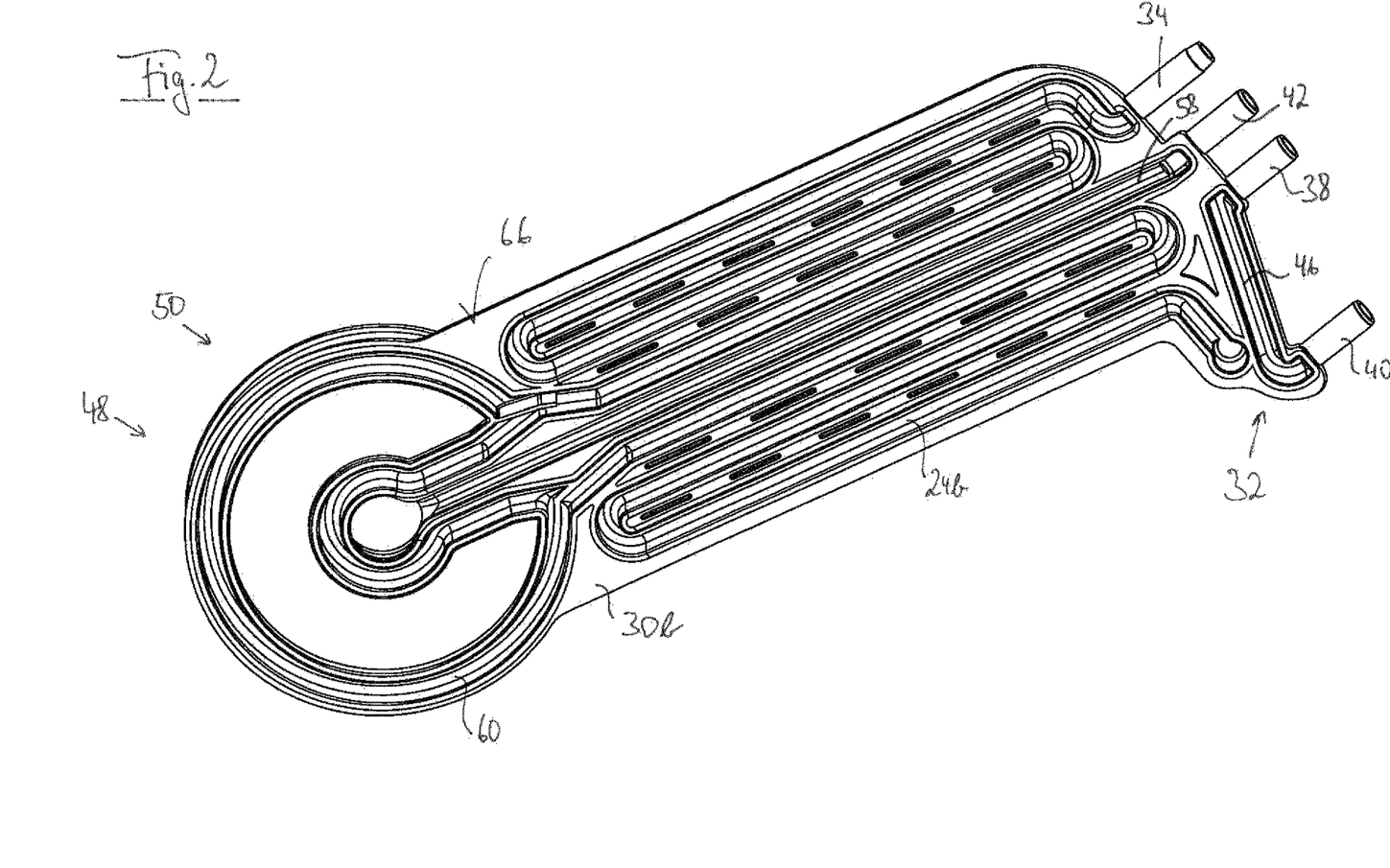
FIG. 2 shows a top view of the joint plane of a partial shell (lower shell) of a heat exchanger body of the heat exchanger shown in FIG. 1.
Figure 3:
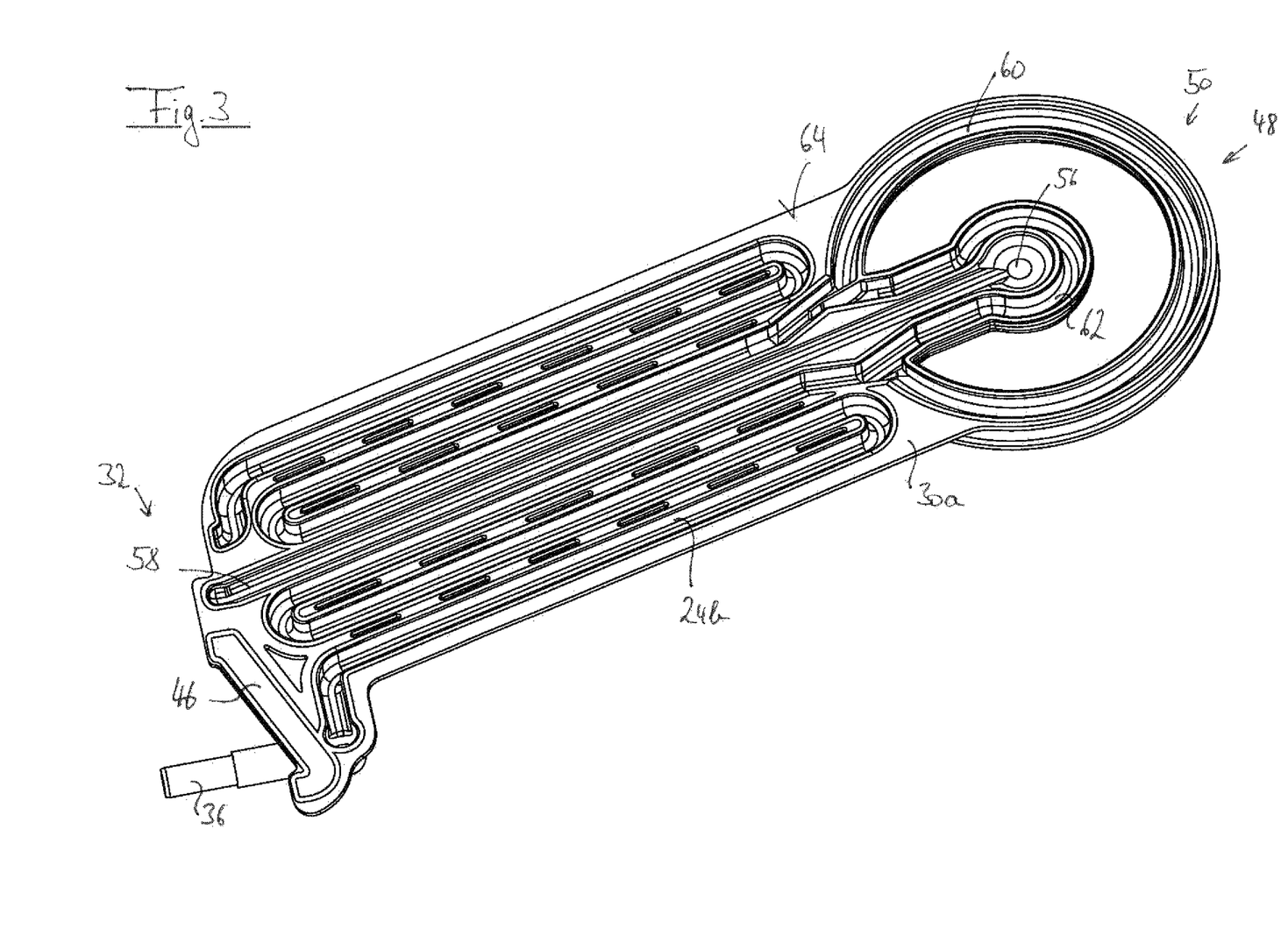
FIG. 3 shows the additional partial shell (upper shell) complementing the partial shell in FIG. 2 to form a heat-exchanger body.

The heat-exchanger body 30 is formed of two injection-molding shells, to be specific an upper shell 30a and a lower shell 30b which are joined together in their joint plane to form the heat-exchanger body 30.

The components 30a and 30b of the heat-exchanger body, preferably produced by the injection molding process, are preferably produced using a filled synthetic material that is particularly suitable for heat transmission, wherein a matrix of thermoplastic synthetic material is filled with filler particles that have a greater thermal conductivity than the matrix material.

On a body end region 30, the heat-exchanger body 30 has a connection-body end 32 on which the line-connection formations 34, 36, 38, 40, and 42 are formed, which are intended for the connection of line components.

The heat-exchanger line 24 has a line section 24a (supply line) leading to the heat-exchanger body 30 that can for example be formed by a flexible hose or by a rigid tube. It also has a line section 24b formed inside the heat-exchanger body 30 which, due to the injection-molding technology construction of the heat-exchanger body 30, is formed as a hard-shell line.

The heat-exchanger line 24 also has a return line 24c, in which the return transport of the liquid 16 circulating in the heat-exchanger line 24 to the heat-exchanger liquid reservoir takes place. The return line 24c can also be configured as a flexible hose.

The pump 28 pumps service liquid from the liquid supply 22 received in the liquid reservoir 14 via the supply line 24a to the line connection formation 34, through which the service liquid enters the heat-exchanger body 30.

After passing through the heat-exchanger line section 24b in the heat-exchanger body 30, the liquid, which has been cooled by emitting heat to the surroundings 26 through the line connection formations 36, once again exits the heat-exchanger body 30 and is pumped via the return line 24c back to the supply of liquid 16 in the heat-exchanger liquid reservoir 14.

The heat-exchanger line section 24b has a meandering line-section with parallel rectilinear line branches, said line section lying between the connection-body end 32 and a filter-carrier body end 48, on which a filter carrier 50 is formed. At least one part of the filter carrier 50 is formed as integral to the heat-exchanger body 30.

Arranged on the filter carrier 50 is a filter 52 sketched out by six struts, one filter 52 being provided on either side of the heat-exchanger body 30, said filters enclosing between them, together with the filter carrier 48, a spatial volume 54.

Centrally, arranged preferably approximately in both the direction of thickness of the filter carrier 48 and also in the diameter-direction of the same, there is an outlet 56 (see FIG. 3) of a pumping line 58, said outlet being assigned to the line-connection formation 42 that extends preferably rectilinearly between parallel line branches of the heat-exchanger line section 24b.

With the pumping line 58, a service liquid can be conveyed out of the volume area 54, during which pumping, due to the filter 52, only filtered service liquid, and thus liquid that is sufficiently pure for the further handling process, can get into the volume area 54.

The pumping of service liquid through the pumping line 58 can take place by an additional pump 59 that is connected to the line formation 42. With the pump 59, the service liquid that is removed via the pumping line 58 can be discharged into the bypass line-connection formation 38 and at a suitable point, fed out of the bypass line-connection formation 40 by means of a rigid or flexible service-liquid line 61 to a consumer, for example an injection device in the exhaust-gas system, if the service liquid is an aqueous urea solution for a selective catalytic reduction.

Alternatively the pump 28 can be used to pump service liquid out of the service-liquid tank 12 through the pumping line 58, in particular if the service liquid stored in the tank 12 is identical to the liquid for the heat-exchange contained in heat-exchanger liquid reservoir 14.

In order to ensure as well that the service liquid in the volume area 54 inside the filter carrier 48, said liquid being sucked in through the outlet 56 of the pumping line 58, is actually present in liquid form, a section of the heat-exchanger line 24b formed in the heat-exchanger body 30 is preferably formed in the wall of the filter carrier 48. This line section is indicated with 60. The outlet 56 of the pumping line 58 can be surrounded by a line branch 62 of the heat-exchanger line 24b formed in the heat-exchanger body 30 in order to keep the outlet 56 from icing up.

The heat-exchanger line 24, as shown especially in FIG. 1, is a circulation line, from which liquid for a heat exchange is taken from the heat-exchanger liquid reservoir 14 and conveyed via a heat-exchanger line 24, in particular via the section 24b of the heat-exchanger line 24 formed inside the heat-exchanger body 30, and back again through the return line 24c into the heat-exchanger liquid reservoir 14. In that way, the electric heating device 20 in the heat-exchanger liquid reservoir 14 needs only to convey the amount of heat to the liquid supply 22 that is emitted on the heat-exchanger body 30 to the external environment 26. In that way, the service liquid in the service-liquid tank 12 can be convectively heated via heat exchange across large areas of the heat-exchanger body 30, and the heat required for the heat exchange can be simply and efficiently fed to the service liquid 16 in the heat-exchanger liquid reservoir 14.

Figure 4:
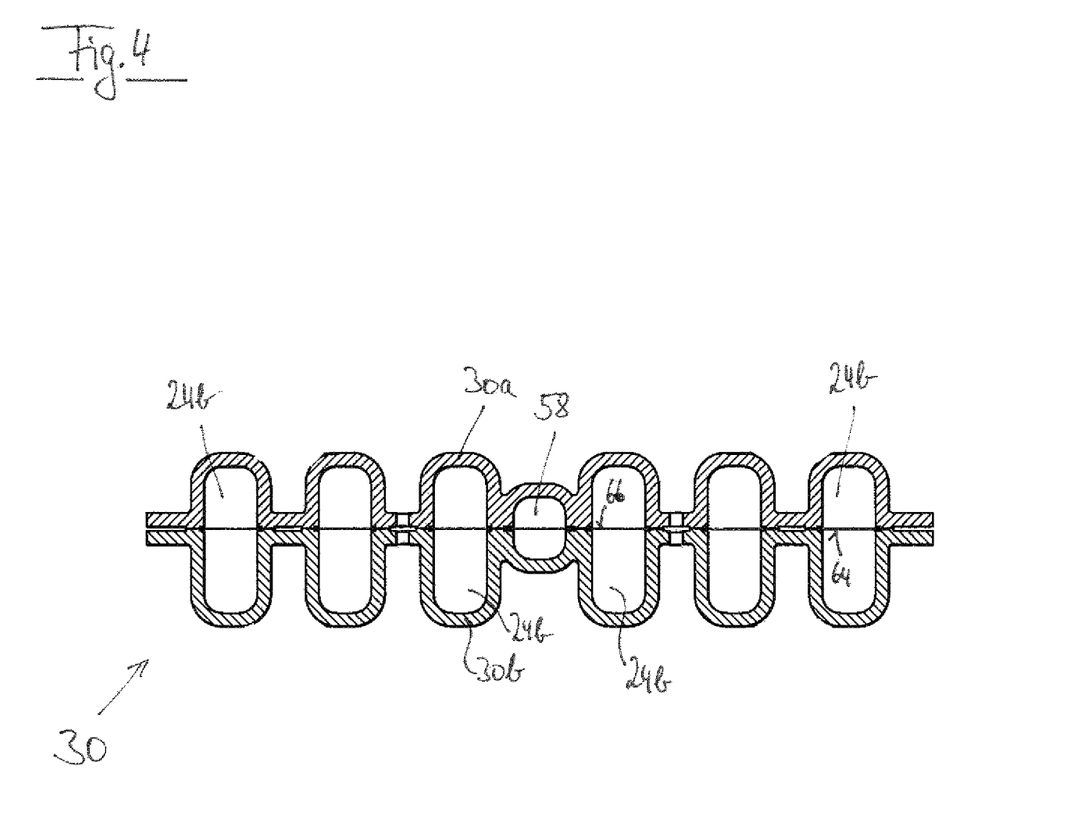
FIG. 4 shows a cross-sectional view through a line section of the heat-exchanger body in FIG. 1.

FIG. 4 shows a cross section through the region of the heat-exchanger body 30 in which the parallel line branches of the section 24b of the heat-exchanger line 24 formed in the heat-exchanger body 30 are located. Only the cross-sectional view is shown, without the line regions situated behind the cross-sectional plane. It can be seen that in the shell components 30a and 30b, originating from their respective joint planes 64, or as the case may be 66, recesses of different depths are formed, said recesses forming, when the two shell components 30a and 30b are joined to the heat-exchanger body 30, the previously described liquid-conveying lines in the heat-exchanger body 30. Advantageously, the pumping line 58 is formed between two line branches of the heat-exchanger line section 24b formed in the heat-exchanger body 30, so that heat can be transferred along the common extent of the pumping line 58 and the heat-exchanger line section 24b directly through the common dividing wall of said lines between the liquid-conveying cavities, so that the service liquid present in the pumping line 58 can also be kept in liquid state.

The invention claimed is:

1. Heat exchanger for arrangement inside a service-liquid tank for a motor-vehicle service-liquid tank, comprising:
   a heat-exchanger liquid reservoir for receiving a supply of liquid;
   an electric heating device, which is constructed and arranged in order to transfer heat into the heat-exchanger liquid reservoir; and
   a heat-exchanger line, which at least originates from the heat-exchanger liquid reservoir and which is constructed for the transfer of heat from the liquid flowing in the heat-exchanger line to a region outside the heat-exchanger line,
   wherein the heat-exchanger line, as a circulation line, empties into the heat-exchanger liquid reservoir;
   wherein the heat exchanger comprises at least two components which, when joined together, form between themselves at least one section of the heat-exchanger line;
   wherein the heat exchanger has a filter carrier, designed as an integral part of the heat exchanger, wherein in or on the filter carrier a filter material is arranged, or can be arranged, outside the heat-exchanger line;

wherein the filter carrier has a wall which encloses a volume; and wherein a section of the heat-exchanger line is formed and extends in the enclosing wall of the filter carrier.

2. Heat exchanger according to claim 1,
wherein the heat exchanger, at least in sections, is formed of a filled plastic material with a plastic material matrix and filler particles embedded therein, whereby the material of the filler particles has a greater thermal conductivity than the plastic material of the matrix.

3. Heat exchanger according to claim 1,
wherein it has a pumping line, separate from the heat-exchanger line that extends starting from an orifice in the filter carrier.

4. Heat exchanger according to one of claim 1,
wherein it has a heat-exchanger body in which is formed a section of the heat-exchanger line, wherein the heat-exchanger body has a connection-body end at which line connection formations are provided for a supply line to the section of the heat-exchanger line formed inside the heat-exchanger body and for a discharge line section from the section of the heat-exchanger line formed inside the heat-exchanger body.

5. Heat exchanger according to claim 4,
wherein a filter carrier is formed inside the heat-exchanger body, wherein between the connection-body end and the filter carrier, at least the heat-exchanger line has flow sections that are parallel to one another.

6. Heat exchanger according to claim 4,
wherein the heat-exchanger liquid reservoir is constructed as separate from the heat-exchanger body and is connected or can be connected to the latter in a flow-conveying manner via conduit means.

7. A service-liquid tank comprising:
a tank;
a heat-exchanger liquid reservoir disposed for receiving a supply of liquid from said tank;
an electric heating device, which is constructed and arranged in order to transfer heat into the heat-exchanger liquid reservoir; and
a heat-exchanger line, which at least originates from the heat-exchanger liquid reservoir and which is constructed for the transfer of heat from the liquid flowing in the heat-exchanger line to a region outside the heat-exchanger line, wherein the heat-exchanger line, as a circulation line, empties into the heat-exchanger liquid reservoir;
wherein the heat exchanger comprises at least two components which, when joined together, form between themselves at least one section of the heat-exchanger line;
wherein the heat exchanger has a filter carrier, designed as an integral part of the heat exchanger, wherein in or on the filter carrier a filter material is arranged, or can be arranged, outside the heat-exchanger line;
wherein the filter carrier has a wall which encloses a volume; and
wherein a section of the heat-exchanger line is formed and extends in the enclosing wall of the filter carrier.

8. Service-liquid tank according to claim 7,
wherein the heat-exchanger liquid reservoir is situated inside the tank.

9. Service-liquid tank according to claim 7,
wherein the heat-exchanger liquid reservoir is located outside the tank.

10. Heat exchanger according to claim 1,
wherein the heat exchanger, at least in a section that contributes to the formation of the heat-exchanger line, is formed of a filled plastic material with a plastic material matrix and filler particles embedded therein, whereby the material of the filler particles has a greater thermal conductivity than the plastic material of the matrix.

11. Heat exchanger according to claim 1,
wherein it has a filter carrier in which or on which a filter material is arranged, or can be arranged, outside the heat-exchanger line, interchangeably.

12. Heat exchanger according to claim 1,
wherein it has a pumping line, separate from the heat-exchanger line that extends starting from an orifice in the filter carrier, extending at least in sections parallel to a section of the heat-exchanger line.

13. Heat exchanger according to claim 1,
wherein it has a pumping line, separate from the heat-exchanger line that extends starting from an orifice in the filter carrier, extending at least in sections between two heat-exchanger line sections.

14. Heat exchanger according to claim 1,
wherein it has a heat-exchanger body in which is formed a section of the heat-exchanger line, wherein the heat-exchanger body has a connection-body end at which line connection formations are provided for a supply line to the section of the heat-exchanger line formed inside the heat-exchanger body and for a discharge line section from the section of the heat-exchanger line formed inside the heat-exchanger body, wherein provided also at the connection-body end is a line-connection formation to the section of the pumping line formed inside the heat-exchanger body, or/and at least one connection formation for a bypass line.

15. Heat exchanger according to claim 1,
wherein it has a heat-exchanger body in which is formed a section of the heat-exchanger line and also of the filter carrier or/and the pumping line, wherein the heat-exchanger body has a connection-body end at which line connection formations are provided for a supply line to the section of the heat-exchanger line formed inside the heat-exchanger body and for a discharge line section from the section of the heat-exchanger line formed inside the heat-exchanger body.

16. Heat exchanger according to claim 4,
wherein the filter carrier is formed inside the heat-exchanger body, wherein between the connection body end and the filter carrier, at least the heat-exchanger line has flow sections that are parallel to one another.

17. Heat exchanger according to claim 4,
wherein the heat-exchanger liquid reservoir is constructed as separate from the heat-exchanger body and is connected or can be connected to the latter in a flow-conveying manner via conduit means, detachably connected or connectable.

18. Service-liquid tank according to claim 7,
wherein the heat-exchanger liquid reservoir is situated inside the service-liquid tank and is open to the tank receiving volume of the service-liquid tank.

19. Heat exchanger according to claim 1,
wherein the at least two components are partial shells or half-shells.

20. Heat exchanger according to claim 16,
wherein also the pumping line between the connection-body end and the filter carrier extends at least in sections parallel to the heat-exchanger line.

* * * * *